Oct. 27, 1970  N. J. ROSENBURGH  3,536,394
SPOT MAGNIFIER
Filed Feb. 15, 1968  2 Sheets-Sheet 1
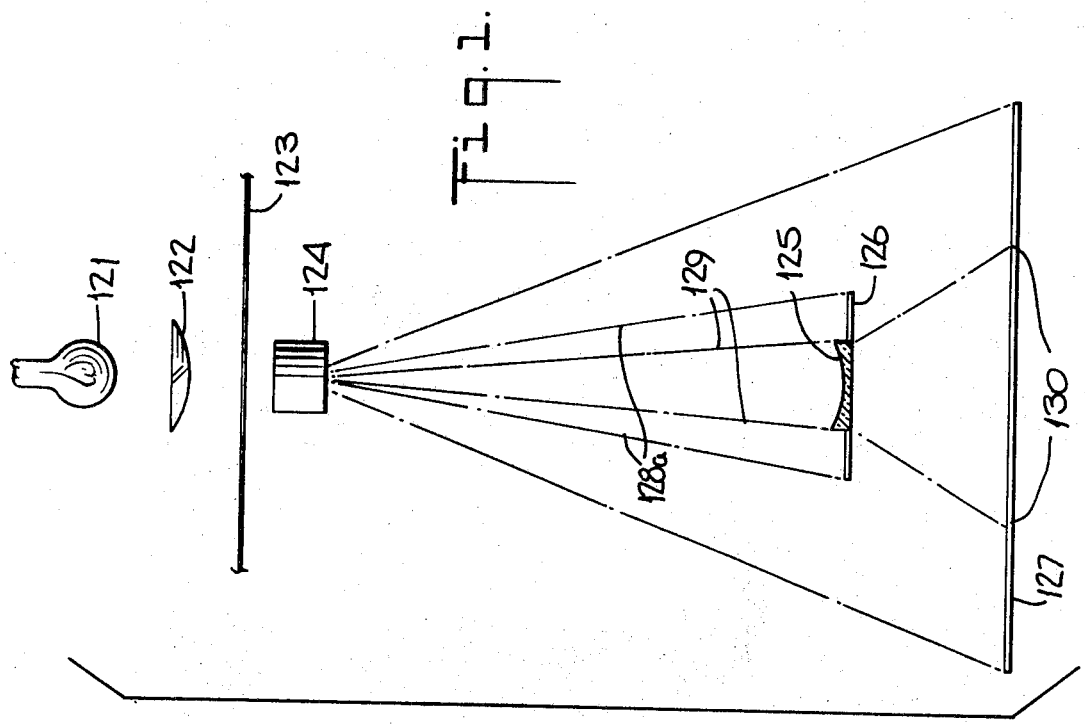
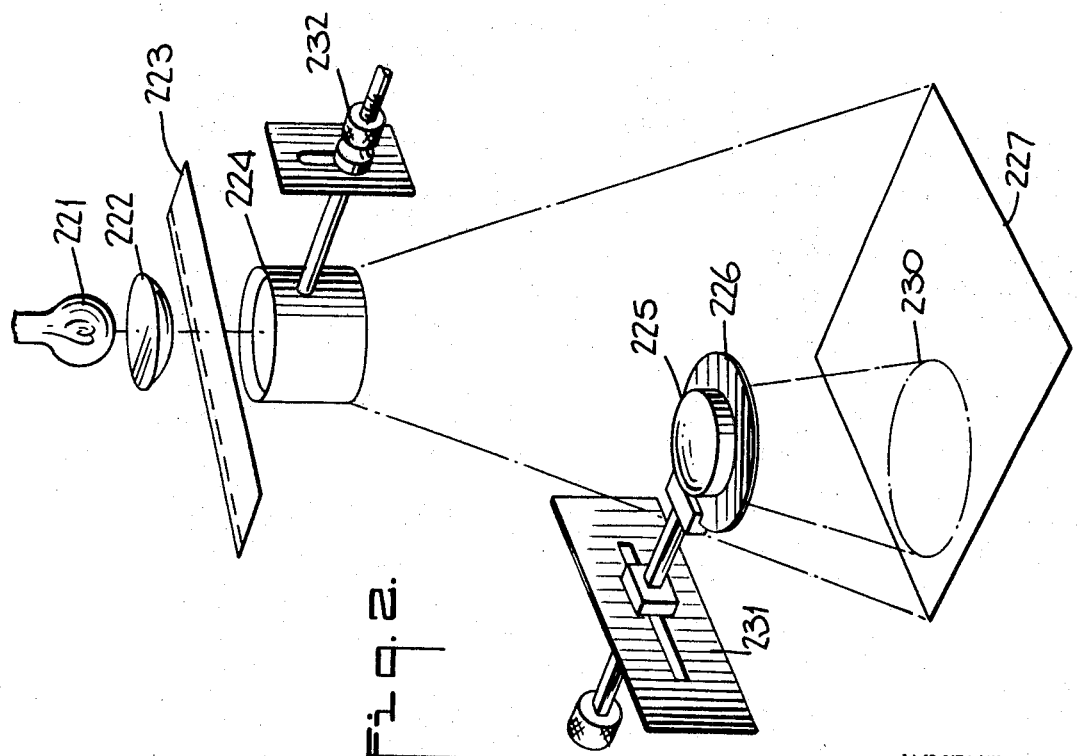
INVENTOR.
NORMAN JOHN ROSENBURGH
BY
ATTORNEYS

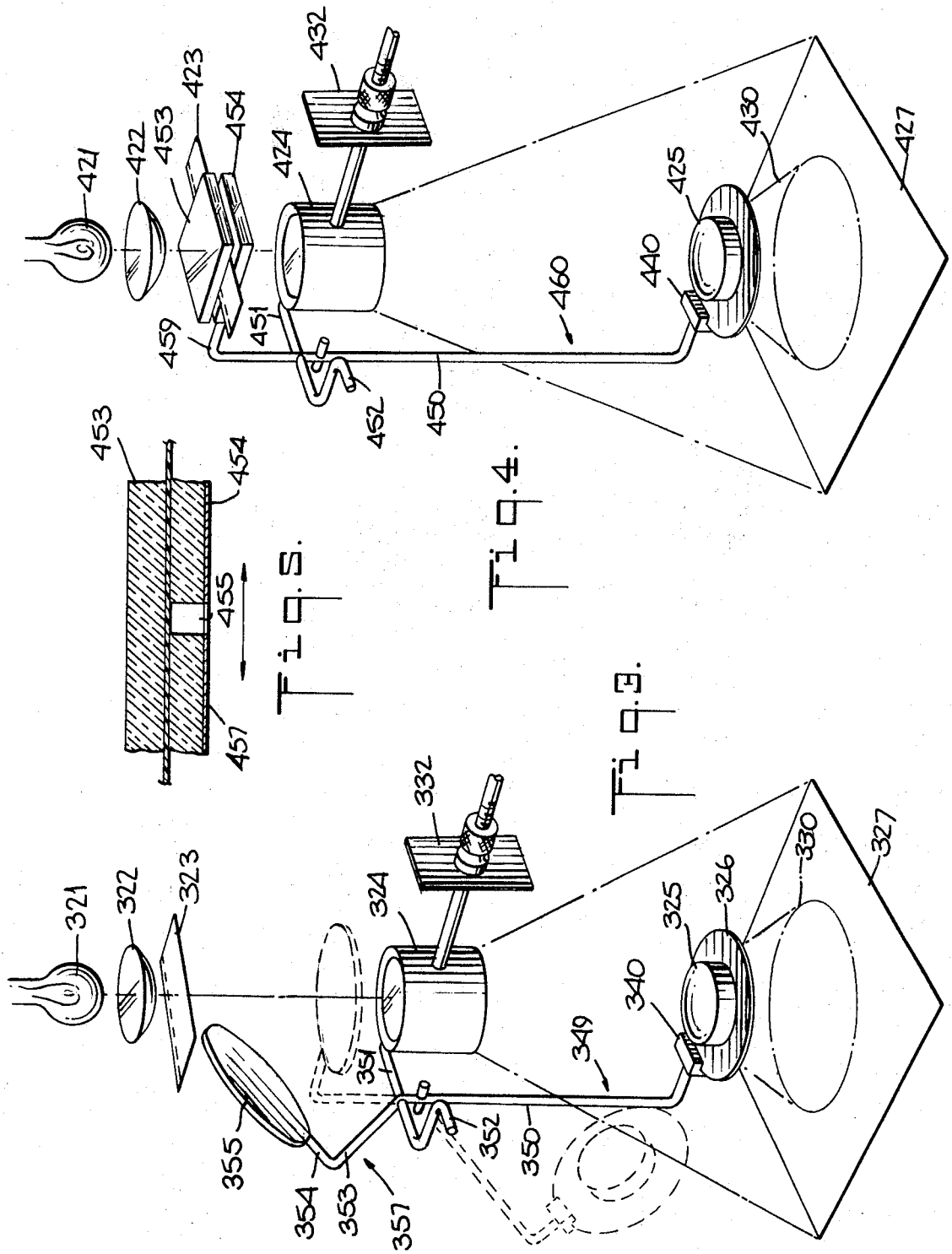

United States Patent Office 3,536,394
Patented Oct. 27, 1970

3,536,394
SPOT MAGNIFIER
Norman John Rosenburgh, Rochester, N.Y., assignor to Eastman Kodak Company, Rochester, N.Y., a corporation of New Jersey
Filed Feb. 15, 1968, Ser. No. 705,792
Int. Cl. G03b 21/00
U.S. Cl. 353—122     15 Claims

ABSTRACT OF THE DISCLOSURE

Microfilm projectors which permit the viewing of either a normal projection or a magnified portion thereof are disclosed. Focus compensator means are included to compensate for the change in focus of the projection lens required by the magnification of a portion of the projected image.

BACKGROUND OF INVENTION

Field of invention

This invention relates to a system capable of magnifying a portion of a projected film image, particularly in microfilm practice.

Description of prior art

In a typical microfilm reader a roll of microfilm is passed between a source of light and a projection lens. The projection lens magnifies an image recorded on the microfilm and projects the magnified image onto a display screen. It is often desirable to provide some means for further magnifying the projected image as where the operator has poor eyesight or where a portion of the projected material is very fine print and/or of insufficient size to be clear to the microfilm operator.

In the past one method utilized to magnify a projected microfilm image has been to place a magnifying lens on the display screen of the microfilm reader. However, this method generally was not successful since the magnifying glass also magnified the grain on the display screen thus not improving the clarity of the projected image.

SUMMARY OF INVENTION

It is therefore an object of the present invention to provide improved means for selectively magnifying portions of a projected image.

It is another object of this invention to provide an improved method of magnifying selected portions of a projected image.

Another object of the present invention is to provide means for magnifying selected portions of a projected image without the necessity of focusing adjustment of the projection lens.

Another object of this invention is to provide improved means for magnifying selected portions of a projected film image and for maintaining magnified portions and unmagnified portions of the projected image simultaneously in focus without necessity of focusing adjustment of the projection lens.

Briefly, in one embodiment of the present invention, a magnifier means, such as a negative lens is placed in a cooperating relation with the microfilm reader projection lens and the display screen of the reader. By appropriately moving the negative lens any portion of the projected microfilm image can be magnified. In this embodiment of the present invention the projection lens of the microfilm reader must be slightly refocused when viewing a magnified image via the negative lens after having viewed an unmagnified image that was in focus.

In a second embodiment of the present invention, a negative lens and a focus shift compensator are attached to a lever mechanism which pivots about a microfilm reader projection lens. The lever mechanism is designed so that when the negative lens is positioned between the projection lens and the display screen, the focus shift compensator is not between the microfilm being used in the microfilm reader and the microfilm reader projection lens. Similarly, when the negative lens is not between the microfilm reader projection lens and the display screen to magnify a portion of the projected image, the focus shift compensator, by the lever mechanism, is positioned between the microfilm in the microfilm reader and the microfilm reader projection lens. In this embodiment of the present invention, the projection lens is focused for use with the negative lens and when the negative lens is not used, the focus shift compensator is moved between the microfilm and the projection lens to readjust the projection lens after being focused for use with the negative lens so that a clear image is viewed on the display screen. This embodiment of the present invention allows a microfilm reader to view either a magnified projection image or an unmagnified projection image in focus without having to adjust the microfilm projection lens, but not both together in focus.

In a third embodiment of the invention, a negative lens is placed between the microfilm reader projection lens and the display screen. A focus shift compensator having a hole therein is positioned between the microfilm and the projection lens. The projection lens is focused to produce a clear image on the viewer screen of an image magnified by the negative lens. The hole in the focus shift compensator insures that the portion of the image that is to be magnified by the negative lens will not be refocused by the focus shift compensator. The image that is not to be magnified passes through the solid part of the focus shift compensator and thus is compensated for the projection lens being focused for a magnified image on the display screen.

BRIEF DESCRIPTION OF DRAWINGS

FIG. 1 is a schematic representation of the optics involved in using a negative lens to magnify a portion of a microfilm image in accordance with the present invention;

FIG. 2 is a schematic illustration of a negative lens magnifying a portion of a projected image in accordance with an embodiment of the present invention;

FIG. 3 is a schematic illustration of a second embodiment of the present invention in which it is possible to view in focus separately a magnified or unmagnified image without having to refocus the microfilm reader projection lens;

FIG. 4 is a schematic illustration of a third embodiment of the present invention which allows a magnified and unmagnified portion of a projected image to be simultaneously viewed in focus; and FIG. 5 is an enlarged section of a portion of the embodiment disclosed in FIG. 4.

DESCRIPTION OF PREFERRED EMBODIMENTS

In FIG. 1, a condenser lens 122 is shown having a light source 121 on one side thereof and a section of microfilm 123 on the other side thereof. A projection lens 124 is positioned on the opposite side of microfilm 123 from condenser lens 122. A display screen 127 is positioned to receive the image projected from projection lens 124. A negative lens 125 is positioned between projection lens 124 and display screen 127. Negative lens 125 is designed to cooperate optically with projection lens 124 to magnify a portion of the projected image and project that magnified portion in proper focus on screen 127, and has a mask 126 on its periphery for a reason soon to become apparent. Thus, part of the image projected by projection lens 124, and indicated by lines 129, will pass through negative lens 125 and appear as a magnified image 130 on display screen 127. Since the magnified image 130 obtained from negative lens 125 is of a larger area than the negative lens 125, part of the unmagnified image projected from projection lens 124 would be projected to overlay the image magnified by negative lens 125 on viewer screen 127 were it not for mask 126. Mask 126 blocks the part of the unmagnified image projected between lines 129 and 128a by projection lens 124 that would fall on the image magnified on screen 127 from negative lens 125.

As identical elements appear throughout the different embodiments of the invention these elements will have the same last two digits throughout FIGS. 1–4 only prefaced by the figure numeral to facilitate understanding the invention.

In FIG. 2, an embodiment of the actual structure schematically disclosed in FIG. 1 is shown with conventional adjustable screw mechanism 232 joined to projection lens 224 to focus the latter. A second adjustment means 231 is joined to negative lens 225 to position the negative lens 225. In this embodiment of the invention negative lens 225 can be moved by adjustable screw mechanism 231 so as to magnify a desired portion of the image projected by projection lens 224. The magnified image 230 can be viewed on an operator screen 227. While this system will allow a certain portion of a projected microfilm image to be magnified, it has the disadvantage that when an operator is passing from an unmagnified image to a magnified image projection lens 224 must be refocused. Similarly when a magnified image is in focus it will be necessary ot adjust the projection lens to be able to view the unmagnified image in focus.

In FIG. 3, I have modified the embodiment of the invention of FIG. 2 to allow a microfilm reader to view either a magnified or unmagnified, in-focus, projection image without having to refocus the projection lens. In FIG. 3, negative lens 325 is attached to a lever mechanism 349 by means of a conventional clamp 340 which is attached to mask 326. Lever mechanism 349 includes a center bar 350 which is attached to or made integral with a pivot bar 351. Pivot bar 351 pivots about its own axis and for that purpose may be mounted by any suitable means. A crank 352 is attached to or made integral with pivot bar 351 to rotate the pivot bar 351. An L-shaped section 357 is attached or made integral with center bar 350 and includes a longer section 353 which is adjacent crank 352 and a shorter section 354 which is perpendicular to section 353. A focus shift compensator, such as glass plate 355, is attached to the end of section 354. It is to be noted that L section 357 and center bar 350 are in the same plane with each other with pivot bar 351 being perpendicular thereto. Lever mechanism 349 is of such shape that when negative lens 325 is positioned, as shown in the figure in solid lines, between projection lens 324 and display screen 327, glass plate 355 is not between microfilm 323 and projection lens 324. Similarly, when negative lens 325 is not between projection lens 324 and viewer screen 327 to magnify a portion of the projected image, as shown in dotted lines, glass plate 355 is disposed between microfilm 323 and projection lens 324.

Projection lens 324 is focused so that when negative lens 325 is utilized, as shown in solid lines, the magnified image will be in focus on display screen 327. Crank 352 controls the position of negative lens 325 with respect to projection lens 324 and glass plate 355 with repect to projection lens 324. If negative lens 325 is not interposed between projection lens 324 and display screen 327, and glass plate 355 is not between microfilm 323 and projection lens 324, the image on display screen 327 will be out of focus. However, when the negative lens is not between projection lens 324 and viewer screen 327, as shown in dotted lines, the lever mechanism 349 will insure that the glass plate 355 will be between microfilm 323 and projection len 324. This has the same effect as refocusing projection lens 324 since the light now reaching the projection lens will have its focal length changed by passing through the glass plate 355 and the unmagnified image on the display screen 327 will be in focus. Thus, it is apparent from this embodiment of the invention that I have designed a system to allow a magnified microfilm image and a non-magnified microfilm image to be viewed sequentially without having to refocus the microfilm reader projections lens 324.

While the embodiment of the invention shown in FIG. 3 allows a magnified image to be seen in focus sequentially with a focused unmagnified image without having to refocus the projection lens, the embodiment does not allow the magnified and unmagnified images to be simultanously viewed in focus. The embodiment of the invention shown in FIGS. 4 and 5 is designed to have the magnified microfilm image and the unmagnified microfilm image in focus simultaneously.

In FIG. 4 a negative lens 425 is joined to a lever mechanism 460 by a clamp 440. Lever mechanism 460 includes a straight center bar 450 which is bent at its top to form short section 459. A member 451 is joined to center bar 450 or made integral therewith and is mounted in suitable means on the reader housing to rotate on its own axis. A crank 452 is either joined to center bar 450 or made integral therewith. Attached to section 459 of lever mechanism 460 is a focus shift compensator in the form of glass plate 454. Microfilm 423 travels on the top of glass plate 454 and is sandwiched between glass plate 454 and glass plate 453 which is fixed with respect to plate 454. As can be seen in FIG. 5, a small hole 455 is disposed in glass plate 454 for a reason soon to be apparent. In this embodiment of the present invention, projection lens 424 is focused for use with negative lens 425 and upper glass plate 453 to provide a clear image on display screen 427. Hole 455 is positioned so that when the lever mechanism rotates glass plate 454 and negative lens 425 to the position shown, the image portion from microfilm 423 and source 421 passing through projection lens 424 to negative lens 425 will not pass through the solid part of glass plate 454 but through the hole therein. Since projection lens 424 is focused for this condition, the magnified image seen on viewer screen 427 will be in focus. The unmagnified image from microfilm 423 that does not pass through negative lens 425 to be magnified will pass through the solid part of glass plate 454 through projection lens 424 and to display screen 427. As will be recalled, projection lens 424 is focused for use with negative lens 425 and glass plate 453 but not glass plate 454. Thus, without glass plate 454, the unmagnified image on viewer screen 427 would be out of focus since this part of the image is not passing through negative lens 425. However, the unmagnified image is passing through the solid part of glass plate 454 which compensates for projection lens 424 being focused for use with a negative lens only and thus provides a clear unmagnified image on display screen 427. Lever mechanism 460 allows negative lens 425 and glass plate 454 to be simultaneously moved so that the image from microfilm 423 and source 421 which passes through negative lens 425 to be magnified will always pass through hole 455 of glass plate 454. Similarly, the image that does not pass through negative lens 425 to be magnified will pass through the solid part of glass plate 454. In the solid part of glass plate 454. Thus, it can be seen that at all times and for all positions of negative lens 425 the magnified and unmagnified image on viewer screen 427 will be in focus. Glass plate 454 is of sufficient size that any projected image that does not pass through hole 455 will pass through the solid part of glass plate 454. In the embodiment shown in FIGS. 4 and 5, the mechanism 460 provides a selecting movement for the magnifying optics across the film width. The film strip can be advanced or taken up to longitudinally position the film area to be magnified with respect to hole 455 and the other optics. It will, of course, be appreciated that if desired, the mechanism 460 can be mounted for universal movement and means provided to maintain lens 425 in a plane, parallel to the screen in order to provide an image-area selection in both longitudinal and transverse directions on the film.

A neutral density filter 457 is preferably applied to the solid portions of the glass plate 454 in order to compensate for the differences in brightness between the unmagnified and magnified images and thus project both images onto the viewer screen with equal brightness.

From the foregoing disclosure, it should be apparent that I have provided various means to view an enlarged microfilm image without decreasing the clarity of the image and in one embodiment of the invention I have designed a microfilm reader system for use with a negative lens which does not require refocusing the microfilm reader projection lens when alternately viewing a magnified or unmagnified microfilm image. Further, I have provided a microfilm system wherein a magnified and unmagnified microfilm image are in focus simultaneously.

The invention has been described with particular reference to preferred embodiments thereof, but it will be understood by those skilled in the art that variations and modications can be effected within the scope and spirit of the invention as described hereinabove and as defined in the appended claims.

I claim:

1. A combination with a film viewer having a screen and a projection lens for projecting an image in an optical path from the film onto the screen, the combination comprising:
    magnifier means movable to a position in the optical path of the projected image for optically cooperating with said projection lens to magnify a portion of the projected image on the screen; and
    focus compensator means movable to a position in the optical path for optically cooperating with said projection lens to compensate for the change in focus effected by the presence of said magnifier means.

2. The combination as in claim 1 including means for alternately positioning said magnifier means and said focus shift compensator means in their respective positions where they optically cooperate with the projection lens.

3. The combination as in claim 1 including means for simultaneously positioning said magnifier means and said focus shift compensator means in their respective positions where they optically cooperate with the projection lens.

4. The combination as in claim 2 wherein said magnifier means is a negative lens positioned between said projection lens and said screen, and said focus shift compensator means is a light diffracting means positioned on the side of said projection lens away from said screen.

5. The combination as in claim 3 wherein said magnifier means is a negative lens positioned between said projection lens and said screen, and said focus shift compensator means is a light diffracting means positioned on the side of said projection lens away from said screen, said diffracting means having a hole therein through which the projection of said magnified portion occurs.

6. In a film projector of the type having an illumination source and projection lens for projecting an image on a film onto a screen, a device for selectively magnifying a portion of the projected image comprising:
    (a) means movable into optical alignment with said projection lens for magnifying a portion of the projected film image;
    (b) light diffracting means movable into optical alignment with said projection lens for varying the length of the light path of a portion of said projected film image passing therethrough; and
    (c) means for selectively moving said magnifying and light diffracting means into and out of said optical alignment with said projection lens.

7. In a film projector of the type having an illumination source and projection lens for projecting an image on a film onto a viewing screen, a device for selectively magnifying portions of a projected image and maintaining said magnified portion and other portions of said projected image in focus on the viewing screen, comprising:
    (a) means movable into optical alignment with said projection lens for magnifying a portion of a projected film image;
    (b) light diffracting means movable into optical alignment with said projection lens for varying the length of the light path of the portion of the film image passing therethrough, said diffracting means defining an opening which, in said aligned position, allows the portion of said film image to be magnified to pass without variation in light path length; and
    (c) means for selectively moving said magnifying and diffracting means into and out of said optically aligned positions.

8. Apparatus having a source of radiation and a projection lens for projecting an image from an information bearing medium onto a surface, said apparatus comprising:
    first means movable into optical alignment with said projection lens for changing the size of a portion of the projected image; and
    second means movable into optical alignment with said projection lens to compensate for the change in focus effected by said first means.

9. Apparatus as claimed in claim 8, wherein there is included means for selectively moving said first and second means into and out of optical alignment with said projection lens.

10. Apparatus as claimed in claim 8, wherein said first means magnifies a portion of the projected image, and there is included means movable into a position with respect to said second means for masking out the unmagnified portions of the projected image which would otherwise fall onto the magnified portion of the projected image.

11. Apparatus having a source of radiation and a projection lens for projecting an image from an information bearing medium onto a surface, the projected image having first and second portions, said apparatus comprising:
    first means movable into optical alignment with said projection lens for changing the size of the first portion of the projected image and for facilitating the focus of the first portion onto said surface; and
    second means movable into optical alignment with said projection lens to facilitate the focusing of the second portion of the projected image onto said surface.

12. Apparatus as claimed in claim 11 including means disposed in optical alignment with said projection lens to facilitate the projection of the first and second portions of the projected image onto said surface with substantially equal brightness.

13. Apparatus having a source of radiation and projection lens for projecting an image of an information bearing medium onto a surface, the projected image having first and second portions, said apparatus comprising:
    first means movable into optical alignment with said projection lens for changing the size of the first portion of the projected image; and
    second means movable into optical alignment with said projection lens for facilitating the focus of the first and second portions of the projected image onto said surface.

14. Apparatus having a source of radiation and projection lens for projecting an image from an information bearing medium onto a surface, the projected image having first and second portions, said apparatus comprising:
    first means movable into optical alignment with said projection lens for magnifying the first portion of the projected image, thereby tending to overlap the first magnified portion of the projected image onto the second unmagnified portion of the projected image; and second means movable into a position with respect to said projection lens and said first means for masking out a part of the second unmagnified portion of the projected image to eliminate substantially the overlapping of the first and second portions of the projected image and to facilitate the simultaneous projection of the first and second portions onto the surface.

15. A combination with a film viewer having a viewing screen and a projection lens for projecting an image on the film onto the screen of:

magnifier means, movable to a position in the projection path of the image, optically cooperating with said projection lens to magnify a portion of the image projected on said screen; and means movable into the image projection path of said magnifier means for masking out the unmagnified portions of the image which would otherwise fall on the magnified portion and for facilitating the simultaneous viewing of the magnified and unmagnified portions of the image upon said viewing screen.

References Cited

FOREIGN PATENTS 1,076,964    3/1960    Germany.

HARRY M. HAROIAN, Primary Examiner

U.S. Cl. X.R.

353—101